(12) United States Patent
Yamamoto et al.

(10) Patent No.: US 8,501,047 B2
(45) Date of Patent: Aug. 6, 2013

(54) MIXED CARBON MATERIAL AND NEGATIVE ELECTRODE FOR A NONAQUEOUS SECONDARY BATTERY

(75) Inventors: Hiroshi Yamamoto, Ikeda (JP); Tatsuo Nagata, Ikeda (JP); Tooru Fujiwara, Nishinomiya (JP)

(73) Assignee: Chuo Denki Kogyo Co., Ltd., Niigata (JP)

( * ) Notice: Subject to any disclaimer, the term of this patent is extended or adjusted under 35 U.S.C. 154(b) by 191 days.

(21) Appl. No.: 13/006,693

(22) Filed: Jan. 14, 2011

(65) Prior Publication Data

US 2012/0037845 A1 Feb. 16, 2012

Related U.S. Application Data

(63) Continuation of application No. PCT/JP2009/062128, filed on Jul. 2, 2009.

(30) Foreign Application Priority Data

Jul. 17, 2008 (JP) ................................. 2008-186197

(51) Int. Cl.
*H01B 1/02* (2006.01)
(52) U.S. Cl.
USPC ............................................ 252/502; 252/500
(58) Field of Classification Search
USPC ........................................ 252/511, 500, 502
See application file for complete search history.

(56) References Cited

U.S. PATENT DOCUMENTS

| | | | | |
|---|---|---|---|---|
| 6,027,833 A * | 2/2000 | Ueda et al. | ................ | 429/218.1 |
| 6,391,495 B1 * | 5/2002 | Choi et al. | ................ | 429/231.4 |
| 2002/0076614 A1 * | 6/2002 | Yoon et al. | ............... | 429/231.95 |
| 2004/0151837 A1 * | 8/2004 | Morita et al. | ............... | 427/372.2 |
| 2004/0229125 A1 * | 11/2004 | Zou et al. | ................... | 429/231.8 |
| 2006/0073387 A1 * | 4/2006 | Sakagoshi et al. | ........ | 429/231.8 |
| 2007/0092428 A1 * | 4/2007 | Sotowa et al. | ............ | 423/445 R |
| 2009/0130561 A1 * | 5/2009 | Matsumoto et al. | ....... | 429/231.8 |
| 2009/0196816 A1 * | 8/2009 | Yamamoto et al. | .......... | 423/448 |
| 2010/0035149 A1 * | 2/2010 | Fujiwara et al. | ............. | 429/209 |

FOREIGN PATENT DOCUMENTS

| | | |
|---|---|---|
| JP | 2000-138061 | 5/2000 |
| JP | 2001-185147 | 7/2001 |
| JP | 2005-044775 | 2/2005 |
| JP | 2005-174630 | 6/2005 |
| JP | 2005-294011 | 10/2005 |
| JP | 2006-049288 | 2/2006 |
| WO | WO 2007000982 A1 * | 1/2007 |

* cited by examiner

*Primary Examiner* — Tri V Nguyen
(74) *Attorney, Agent, or Firm* — Clark & Brody

(57) ABSTRACT

A negative electrode material provided by the present invention capable of suppressing a decrease in charge acceptance and high temperature storage properties in an electrode with a high capacity and a high density is a mixed carbon material comprising carbon material A having cores of graphite powder with amorphous carbon and/or turbostratic carbon adhered to or coated on the surface of the cores and carbon material B which is graphite powder, the compressibility which is the density $(g/cm^3)$ of the material when 1.00 grams of the material are packed into a cylindrical mold with an inner diameter of 15 mm and compressed by applying a pressing force of 8.7 kN and reducing the pressing force to 0.15 kN is 1.60-1.78 $g/cm^3$ for carbon material A and 1.75-1.85 $g/cm^3$ for carbon material B, the compressibility of carbon material A is less than the compressibility of carbon material B, and the mixing ratio (carbon material A/carbon material B) is 1-9 as a mass ratio.

5 Claims, No Drawings

MIXED CARBON MATERIAL AND NEGATIVE ELECTRODE FOR A NONAQUEOUS SECONDARY BATTERY

TECHNICAL FIELD

This invention relates to a graphite powder based mixed carbon material suitable for a negative electrode of a nonaqueous secondary battery such as a lithium ion secondary battery and a negative electrode for a nonaqueous secondary battery using this carbon material.

BACKGROUND ART

Graphite based materials and particularly artificial graphite powder are primarily used as carbon materials constituting negative electrodes in lithium ion secondary batteries.

There has been much research aimed at increasing the capacity per unit mass of graphite based materials in order to increase the capacity of lithium ion secondary batteries. As a result of such efforts, a graphite based material exhibiting a capacity exceeding 360 mAh/g (compared to the theoretical capacity of graphite of 372 mAh/g) has been developed, and increases in the capacity of graphite based materials themselves have nearly reached a limit.

Under such conditions, it has been attempted to increase the capacity of batteries by further compressing a negative electrode material and increasing the packing density of electrodes. In order to compress and compact a graphite based material, it is necessary to deform graphite particles and fill vacant spaces. Soft graphite particles are suitable for this purpose.

A highly crystalline graphite based material such as natural graphite easily is extremely soft and easily deforms since it readily undergoes interlayer sliding. Therefore, it is easy to increase electrode density with this material. However, when subjected to a slight pressure, closed pores develop in an electrode, and the charge acceptance of the electrode ends up decreasing.

A material comprising a soft, highly crystalline graphite such as natural graphite having its surface covered with low crystallinity carbon or having such carbon locally adhered to its surface undergoes suppressed interlayer sliding in the interior graphite due to the low crystallinity carbon which has a high hardness. Therefore, closed pores do not readily develop, and a decrease in charge acceptance is suppressed. However, the high hardness of particles causes an increase in the applied pressure required to compress a negative electrode material, and the electrode density cannot be increased in cases when the negative electrode material cannot be adequately compressed due to apparatus limitations. If excess compression is carried out in order to obtain a high electrode density, marked collapse of the surface coating of the negative electrode material occurs, leading to a large decrease in high temperature storage properties (a decrease in capacity when a battery having an electrode using the negative electrode material is stored at a high temperature). In addition, hard particles do not experience sufficient contact between particles. Therefore, storage properties worsen due to the contact resistance between particles which increases after high temperature storage.

In this respect, Patent Document 1 proposes mixing flake graphite particles with graphite particles having their surface coated with amorphous graphite. The flake graphite particles are easily crushed and can act as a cushion. Therefore, according to that document, as a result of this mixing, collapse of the coated graphite particles when an electrode is subjected to rolling can be suppressed, and an increase in the specific surface area can be suppressed, thereby suppressing a decrease in the charging and discharging efficiency.

Patent Document 2 describes mixing of natural flake graphite which has undergone spheroidizing pulverization and then heat treatment at a high temperature with graphite particles having their surface coated with amorphous carbon or the like (see claim 4 and Example 6, for example).

Patent documents 3 and 4 propose mixing graphite which is coated with non-graphitic carbon (referred to below as coated graphite) with uncoated graphite.

Prior Art Documents

Patent Documents
  Patent Document 1: JP 2000-138061 A
  Patent Document 2: JP 2006-49288 A
  Patent Document 3: JP 2001-185147 A
  Patent Document 4: JP 2005-44775 A

DISCLOSURE OF INVENTION

Problem which the Invention is to Solve

In Patent Document 1, however, the coated graphite particles or flake graphite particles which are used are not suitable, and the electrode density is not increased even when a large pressure is applied.

Specifically, in Examples 1-6 of Patent Document 1, artificial graphite (HAG-5) manufactured by Nippon Graphite Industries, Ltd. is used as cores for the coated graphite particles. Since this graphite is a highly hard material, the resulting coated graphite particles (HAG-5P) are also hard, and even if a high pressure of 1.8 tons/cm$^2$ is applied to the resulting mixed material, the electrode density is increased to no more than 1.52 g/cm$^3$ (Table 1). In addition, a battery using this electrode has a low discharge capacity of at most 307 mAh/g.

In Examples 7-9 of Patent Document 1, mesocarbon microbeads which are a hard material are used as cores for the coated graphite particles. In this case, it is necessary to apply a pressure of at least 2 tons/cm$^2$ in order to increase the electrode density of the mixed material. Furthermore, the discharge capacity of a battery using this electrode is a low value of at most 335 mAh/g. Moreover, that patent document contains no mention of charge acceptance or high temperature storage properties.

Patent Document 2 does not sufficiently study carbon having its surface coated and particularly the relationship with uncoated carbon with respect to strength. According to investigations by the present inventors concerning the example of a mixed carbon material (Example 6) in that patent document, it is thought that, as described below, the charge acceptance of the mixed carbon material is not necessarily high.

In the examples of Patent Documents 3 and 4, the upper limit on the electrode density is around 1.5 g/cm$^3$, and only examples in which the electrode density is low are given in these documents. Moreover, in the examples, uncoated graphite which is mixed has a large particle diameter. Therefore, when the added amount of uncoated graphite is small, it is thought that the contact between particles is insufficient and that the high temperature storage properties worsen. When the added amount of uncoated graphite is large, it is thought that if the electrode density is made high, closed pores readily develop inside the electrode, resulting in a poor charge acceptance.

This invention was made in light of the above-described circumstances, and its object is to provide a negative electrode material which suppresses a decrease in charge acceptance and high temperature storage properties in a high-capacity, high-density electrode.

Means for Solving the Problem

According to one aspect, the present invention, which is provided in order to solve the above-described problems, is a mixed carbon material comprising carbon material A which has cores of graphite powder having carbon adhered to or coated on the surface of the cores, and carbon material B which is graphite powder, wherein the carbon which is adhered to or coated on the surface of the cores of carbon material A is at least one of amorphous carbon and turbostratic carbon, the compressibility which is expressed by the compressed density defined below is 1.60-1.78 g/cm$^3$ for carbon material A and 1.75-1.85 g/cm$^3$ for carbon material B, the compressibility of carbon material A is less than the compressibility of carbon material B, the average particle diameter of carbon material B is less than or equal to the average particle diameter of carbon material A, and the mixing ratio of carbon material A to carbon material B (carbon material A/carbon material B) is 1-9 as a mass ratio.

The compressed density which indicates compressibility is the density (g/cm$^3$) when 1.00 grams of a material are packed into a cylindrical mold having an inner diameter of 15 mm and compressed by applying a force of 8.7 kN followed by reducing the force to 0.15 kN.

Preferably, carbon material B is or comprises natural flake graphite powder.

The average particle diameters of carbon material A and carbon material B are preferably 15-30 μm and 8-15 μm, respectively.

The specific surface area of carbon material B is preferably at most 8 m$^2$/g.

According to another aspect, the present invention provides a negative electrode for a nonaqueous secondary battery which is manufactured using the above-described mixed carbon material.

Effects of the Invention

When a mixed carbon material according to the present invention is compressed, suitable deformation of carbon material B fills spaces between particles of the mixed carbon material. In addition, carbon material A has suitable compressibility so that rupture of carbon material A is suppressed. Accordingly, a negative electrode for a nonaqueous secondary battery and particularly a negative electrode for a lithium ion secondary battery made from this mixed carbon material as a negative electrode material has a high electrode density, and at the same time it has excellent high temperature storage properties.

EMBODIMENTS OF THE INVENTION

Below, the best mode of a mixed carbon material suitable for a nonaqueous secondary battery and particularly for a lithium ion secondary battery and the ranges on the manufacturing conditions and the reasons for setting these ranges will be explained.

1. Carbon Material A

Carbon material A according to the present invention comprises cores made of graphite powder having carbon adhered to or coated on the surface of the cores. The carbon which is adhered to or coated on the surface of the cores of carbon material A (referred to below as surface carbon) is at least one of amorphous carbon and turbostratic carbon. Carbon material A has a compressibility, expressed by the below-defined compressed density, of 1.60-1.78 g/cm$^3$, which is smaller than the compressibility of carbon material B (described in detail below), and its average particle diameter is greater than or equal to the average particle diameter of carbon material B. Compressibility is expressed by the compressed density, which is defined as the density when 1.00 grams of a material by itself are packed into a cylindrical mold having an inner diameter of 15 mm and compressed by applying a force of 8.7 kN followed by reducing the force to 0.15 kN. In this description, unless otherwise specified, compressibility means the compressed density under these conditions.

(1) Compressibility

According to the present invention, the compressibility of carbon material A is smaller than the compressibility of carbon material B, which indicates that carbon material A has a higher hardness than carbon material B. Therefore, when a mixed carbon material according to the present invention is compressed, carbon material B preferentially deforms and fills the spaces formed between particles of the carbon material. Accordingly, due to the compressibility of the two types of carbon material constituting the mixed carbon material having the above-described relationship, an increase in the electrode density when the material is formed into an electrode material is realized.

The compressibility of carbon material A depends on the particle diameter of carbon material A and on the type and amount of material which adheres to or coats the surface of the graphite powder which forms the cores of the particles. As a basic tendency, compressibility decreases as the particle diameter decreases, and it also decreases as the amount of surface carbon increases.

If the compressibility of carbon material A exceeds 1.78 g/cm$^3$, the powder is excessively soft, so carbon material A also easily deforms when it is compressed in order to form an electrode. As a result, it becomes easy for closed pores to develop in the electrode, and the charge acceptance of the electrode decreases. This is because if closed pores develop, a portion of the surface of the electrode material powder does not contact an electrolytic solution and prevents Li from entering. On the other hand, if the compressibility of carbon material A is less than 1.60 g/cm$^3$, the powder is excessively hard, and it becomes necessary to increase the applied pressure at the time of forming an electrode in order to increase electrode capacity. Increasing the applied pressure crushes the surface carbon and a SEI (solid electrolyte interface) film forms on the new surface which is formed on the crushed surface, and a tendency for high temperature storage properties to worsen is observed. Accordingly, the compressibility of carbon material A according to the present invention is in the range of 1.60-1.78 g/cm$^3$. From the standpoint of achieving both good charge acceptance and high temperature storage properties, the compressibility is preferably from 1.60-1.75 g/cm$^3$.

(2) Graphite Powder

There are no particular limitations on the type of graphite powder which forms the cores of carbon powder A according to the present invention, but it is preferable to use natural graphite, artificial graphite, or kish graphite. From the standpoints of cost and capacity, it is particularly preferable to use powder formed from natural flake graphite. The natural flake graphite which has been spheroidized may be used. From the standpoints of a high capacity and ease of deformation, the interlayer distance between carbon layers of graphite (d002) is preferably at most 0.336 nm.

(3) Average Particle Diameter

In the present invention, the average particle diameter means the particle diameter D50 at volume fraction of 50% in a cumulative particle diameter distribution. It is measured by a laser diffraction particle size distribution analyzer.

The average particle diameter of carbon material A according to the present invention is greater than or equal to the average particle diameter of below-described carbon material B according to the present invention. If the average particle diameter of carbon material A is smaller than the average particle diameter of carbon material B, there is an increasing tendency for regions in which contact between particles is insufficient to develop, and the contact resistance between particles increases. In addition, it becomes easy for contact between particles which causes collapse of the surface carbon to occur, and there is a possibility of high temperature storage properties decreasing.

This is for the following reasons. When a mixed carbon material according to the present invention is compressed and particles of the carbon material are caused to contact, since carbon material B is softer than carbon material A, carbon material B preferentially deforms, thereby filling the spaces which develop between particles of the carbon material and increasing the electrode density. However, as described below, the mass ratio of carbon material A to carbon material B is at least 1. Therefore, when the particle diameter of carbon material B is larger than the particle diameter of carbon material A, the number of particles of carbon material A becomes larger than the number of particles of carbon material B. As a result, the proportion of the regions where the particles of hard carbon material A contact each other increases, and in such regions, contact may become inadequate depending upon the state of compression. If there is an excessive number of such regions in which contact is inadequate, contact resistance between particles increases and the number of particles which do not contribute to charging and discharging increases.

Furthermore, when hard materials contact each other, their contact pressure is higher than when contact with soft materials takes place, and the surface carbon is easily collapsed at the contact points. As a result, high temperature storage properties may worsen.

In addition, contact of hard materials with each other makes it easy to cause spaces between particles to remain, making it difficult to increase the electrode density. If the applied pressure is increased at this time in order to obtain a prescribed electrode density, the hard surface carbon is further collapsed, and a further decrease in high temperature storage properties may occur.

The average particle diameter of carbon material A is preferably at least 15 μm to at most 30 μm while maintaining the above-described relationship to the average particle diameter of carbon material B. If the average particle diameter exceeds 30 μm, compared to the case in which the average particle diameter of the graphite particles which form the substrate of carbon material A is small, it becomes relatively difficult to exhibit the effect of increasing the hardness of the carbon material as a whole due to the surface carbon, and it becomes easy for rupture inside the graphite particles (interlayer sliding fracture) to develop. As a result, closed pores easily develop inside the electrode, and the charge acceptance may decrease. In addition, since the particles become too easy to deform, it is concerned that high temperature storage properties may deteriorate due to collapse of the coating. When the average particle diameter is too large, surface irregularities easily develop in the electrode surface, and the surface irregularities may cause short circuits in a battery. On the other hand, when the average particle diameter is smaller than 15 μm, the density at the time of compression becomes excessively small and it becomes difficult to increase electrode density. If excessive pressure is applied at this time, collapse of the coating carbon occurs and high temperature storage properties worsen.

(4) Specific Surface Area

The specific surface area of carbon material A according to the present invention is preferably at most 5 $m^2/g$. If the specific surface area is excessively high, the reactivity of the material with an electrolytic solution increases and it is concerned that a deterioration in high temperature storage properties occur. In the present invention, the specific surface area is determined by the BET method by nitrogen gas adsorption in the conventional manner.

(5) Carbon

I) Structure

As described above, carbon material A according to the present invention comprises cores of graphite powder to which carbon is adhered or which is coated with carbon. This carbon is at least one of amorphous carbon and turbostratic carbon. Here, turbostratic carbon means a carbon material in which carbon atoms form a layer structure parallel to the direction of a hexagonal network plane but their crystalline regularity in the three-dimensional direction cannot be measured. In an x-ray diffraction chart, the hkl diffraction lines do not appear (101, 103, and the like). However, in a composite material according to the present invention, since the substrate has strong diffraction lines, it is difficult to identify turbostratic carbon by x-ray diffraction. Therefore, it is preferable to identify it by TEM or the like. Amorphous carbon means carbon which has a short range order (on the order of several atoms to ten and several atoms), but does not have a long range order (on the order of several hundred to several thousand atoms).

In amorphous carbon, the ratio of sp2 bonds and sp3 bonds varies with the manufacturing method, but in general, the proportion of sp3 bonds is higher than in turbostratic carbon. Therefore, the hardness of amorphous carbon is frequently higher than the hardness of turbostratic carbon. In either case, since the hardness of these types of carbon is higher than the hardness of the graphite which forms the cores, in a mixed carbon material which is a mixture of carbon material A having carbon present on its surface and carbon material B on which it is not present, carbon material B preferentially deforms at the time of compression.

Example 6 of above-described Patent Document 2 discloses a mixed material fowled by mixing carbon material (b) which comprises a graphite material coated with a heat-treated carbonaceous binder and the negative electrode material of Example 2 formed from an uncoated graphite material. When the R value in Raman spectrum (Raman R value) of this carbon material (b) is investigated, in view of the data of the Raman R value of the negative electrode material of Example 2 which is 0.03 and that of the negative electrode material of Example 6 which is 0.09 and the mixing ratio of the negative electrode material of Example 2 and carbon material (b) which is 40:60, the Raman R value of carbon material (b) by itself is estimated to be around 0.13. The fact that the Raman R value is such a low value means that the D band peak is small. Therefore, it is thought that the degree of disorder of the graphitic structure in the heat treated pitch material on the surface of carbon material (b) is small and that there is a small difference in hardness compared to the graphite material forming a substrate. In contrast, the Raman R value of amorphous carbon and/or turbostratic carbon which is surface carbon according to the present invention is generally 0.2 or above.

Accordingly, although this carbon material (b) is coated with a heat-treated pitch material, in view of the heat treatment temperature which is considerably high, it is thought that the coating material does not have a high hardness or strength like carbon material (A) according to the present invention.

II) Adhesion or Coating Method

There are no particular limitations on a method of adhesion or coating of this carbon on graphite powder. Typically it is carried out by the below-described surface treatment method or deposition method using a vacuum film-forming technique. Whichever method is used, since carbon adheres to or coats the surface of graphite particles, the particle diameter of carbon material A becomes somewhat larger than that of the graphite used as a core material. For example, when the surface treatment method is used, the particle diameter typically increases by a magnitude between several nm and around 5 μm.

i) Surface Treatment Method

This is a method in which an organic compound such as pitch is partially adhered to or coated on the surface of graphite powder followed by heat treatment in order to carbonize the organic compound. Carbon which is adhered or coated by this method is turbostratic carbon.

Specific examples of a method for coating graphite powder with an organic compound are as follows.

(a) An organic compound such as pitch is heated to melt and then kneaded with graphite powder.

(b) An organic compound such as pitch is made into a liquid state, and graphite powder is immersed in the liquid and then washed with a solvent to remove excess organic compound.

(c) An organic compound such as pitch in a liquid state is mixed with graphite powder, and the mixture is heated while stirring.

A specific example of a method of adhering an organic compound to graphite powder is a method in which pitch powder with an average particle diameter of at most 500 μm is mixed in a solid phase with graphite powder. There are no particular limitations on a means for this mixing, and a V blender may be used, for example. During the below-described subsequent heat treatment, the organic compound is allowed to melt and adhere to the graphite powder.

An example of heat treatment conditions for carbonizing an organic compound which is adhered or coated in this manner is heat treatment at a temperature of 850-2000° C. If the heat treatment temperature is excessively increased, the surface carbon does not become amorphous carbon and/or turbostratic carbon, and graphite having little disorder in crystal structure is formed instead. As a result, it is no longer possible to realize an increase in hardness due to surface carbon. The duration of heat treatment can be suitably selected depending on the temperature and the properties of the organic compound used, and typically it is on the order of one hour. The heat treatment atmosphere is an inert atmosphere or a vacuum so that oxidation will not take place. From the standpoint of economy, a nitrogen atmosphere is preferred.

ii) Deposition Method

There are no particular limitations on a vacuum film-forming technique which can be applied in the present invention as long as amorphous carbon and/or turbostratic carbon can be deposited on the surface of graphite powder. Chemical vapor deposition (CVD) or sputtering may be used. Vacuum deposition, the plasma method, ion plating, ion beam sputtering, and the like can also be used.

2. Carbon Material B

Carbon material B according to the present invention is graphite powder having no amorphous carbon and/or turbostratic carbon adhered or coated on the surface thereof and having a compressibility of $1.75 \text{ g/cm}^3$-$1.85 \text{ g/cm}^3$. The compressibility of carbon material B is larger than the compressibility of carbon material A, and its average particle diameter is less than or equal to the average particle diameter of carbon material A.

(1) Compressibility

If the compressibility of carbon material B exceeds L85 g/cm$^3$, closed pores develop inside an electrode and the charge acceptance of the electrode decreases. On the other hand, if the compressibility of carbon material B is less than $1.75 \text{ g/cm}^3$, the hardness of carbon material B is too high, and the coated carbon of carbon material A is collapsed, resulting in worsening of high temperature storage properties. The compressibility of carbon material B depends upon its particle diameter, with compressibility decreasing as the particle diameter decreases. As stated previously, the compressibility of carbon material B is set to be larger than the compressibility of carbon material A.

(2) Graphite Powder

There is no particular limitation on the type of graphite powder which forms carbon material B according to the present invention, but it is preferable to use natural graphite, artificial graphite, or kish graphite. From the standpoints of economy and discharge capacity, a powder formed from natural flake graphite is preferred. Spheroidized natural flake graphite powder may be used. From the standpoints of a high capacity and ease of deformation, graphite in which the interlayer distance of carbon layers (d002) is at most 0.336 nm is preferred. It is also possible to use graphite powder which has been heat treated at a high temperature.

(3) Average Particle Diameter

As stated above, the average particle diameter of carbon material B is less than or equal to the average particle diameter of carbon material A.

A more preferred range for the average particle diameter of carbon material B is at least 8 μm to at most 15 μm. If the average particle diameter is above this range, when the proportion of carbon material B in the mixed carbon material is large, closed pores easily form in an electrode, and a decrease in charge acceptance of the electrode may take place, and when the proportion of carbon material B is small, the contact between particles of carbon material A becomes insufficient and it is concerned that high temperature storage properties worsen. On the other hand, when the average particle diameter is below this range, it tends to become difficult to increase the electrode density. Particularly when fine powder (specifically at most 5 μm in diameter) is present, not only does the electrode density not increase but the specific surface increases. Accordingly, it is desirable to remove fine powder by a suitable method such as air classification.

(4) Specific Surface Area

The specific surface area of carbon material B according to the present invention is preferably at most 8 m$^2$/g. When the specific surface area is large, high temperature storage properties worsen in the same manner as with carbon material A. In addition, at the time of electrode preparation, a large amount of solvent becomes necessary and handling becomes difficult. Therefore, from the standpoint of processability, the specific surface area is preferably not excessively high.

3. Mixing Ratio

The mixing ratio of carbon material A to carbon material B according to the present invention, namely, carbon material A/carbon material B is preferably in the range of 1-9 as a mass ratio. If the mixing ratio is above this range, the applied pressure necessary to obtain a prescribed density increases and it becomes easy to collapse the surface carbon. In addition, in this case, the contact area between particles may become insufficient. Therefore, when the proportion of carbon material A becomes markedly excessive and the mixing ratio becomes too high, high temperature storage properties may worsen. On the other hand, if the mixing ratio is below the above-described range, it becomes easy for closed pores to develop in an electrode, and there is a tendency for charge acceptance of the electrode to decrease. A more preferred range for the mixing ratio is 1.5-4.

4. Manufacturing Method

A mixed carbon material according to the present invention can be obtained by mixing carbon material A and carbon material B according to the present invention by a known method (such as using a known V blender). There are no particular limitations on the mixing conditions (atmosphere, temperature, and the like), but mixing in air at room temperature is preferable from the standpoint of cost.

Manufacture of a negative electrode for a nonaqueous secondary battery using a mixed carbon material according to the present invention as an electrode material and manufacture of a secondary battery can be carried out in a conventional manner. A manufacturing method will be briefly explained below, but this explanation is only an example and other methods and structures are possible.

A slurry for coating is formed by mixing carbon material used as a negative electrode material with a suitable binder and a solvent, and if necessary adding to the mixture a suitable electrically conductive material in order to improve electrical conductivity. Mixing can be carried out, if necessary by use of a homogenizer or glass beads. The slurry is applied by the doctor blade method or the like to a suitable current collector material (rolled copper foil, electrodeposited copper foil, or the like), and after drying, the applied layer is subjected to densification by rolling or the like to manufacture an electrode for use as a negative electrode.

Known materials, for example, polyvinylidene fluoride, styrene butadiene rubber (SBR), and the like can be used as a binder, and sodium carboxymethyl cellulose (CMC), polyvinyl alcohol, and the like can be used as a thickener. The amounts of these materials which are used can be within the ranges typically employed for each of these materials. As an example, the SBR content is 1-3 mass % and the CMC content is 0.5-2 mass %.

N-methyl pyrolidone, water, or the like can be used as a solvent for the binder. The electrically conductive material is a carbon material or a metal (Ni or the like). Examples of a carbon material for a conductive material are artificial graphite, natural graphite, carbon black, acetylene black, and the like. It may be not only in the form of a powder but also in the faun of fibers.

The basic elements of a nonaqueous secondary battery includes a negative electrode, a positive electrode, a separator, and a nonaqueous electrolytic solution. There are no particular limitations on the structure of the positive electrode or the separator. As stated above, the electrolytic solution preferably does not contain a substantial amount of propylene carbonate (PC). For example, one or more substances selected from alkyl carbonates such as ethylene carbonate (EC) and ethyl methyl carbonate (EMC) can be used to form an electrolytic solution. There are no particular limitations on the shape of the battery, and it can be cylindrical, rectangular, coin shaped, sheet shaped, or the like.

EXAMPLES

The present invention will be explained more specifically by the following examples, but it is not limited by these examples.

1. Preparation of a Negative Electrode Material

In the following examples and comparative examples, unless otherwise specified, parts indicates parts by mass.

In addition, in the examples and comparative examples, the average particle diameter was the particle diameter at a volume fraction of 50% determined using a laser diffraction/scattering type particle size distribution analyzer (Model LA-910) manufactured by Horiba, Ltd. In the measurement, the dispersion medium was water to which was added 0.1 weight % of a surface active agent containing an alkyl glycoxide, dispersing was carried out for 5 minutes by ultrasonic dispersing, and the laser transmittance at the time of measurement was 85-95%. The specific surface area was the value measured by the BET method with nitrogen gas adsorption using Quantasorb manufactured by Yunsa Ionics, Ltd.

The compressed density, which is an index of the compressibility of powder, was measured by the following method using a uniaxial compression machine.

1.00 grams of a powder sample were packed into a mold with an inner diameter of 15 mm and compressed by applying a force of 8.7 kN with a uniaxial compression machine for 5 seconds followed by reducing the force to 0.15 kN, and the location of the upper punch was measured. The speed of pressing was at most 10 min/second. The above procedure was performed except for packing a powder sample into the mold, and the position of the upper punch was measured and used as a reference position. The difference between the position of the upper punch when the mold was packed with a powder sample and the reference position was determined to be the sample thickness, and the compressed density was calculated from this thickness by the following formula.

$$\text{Compressed density (g/cm}^3\text{)}=1.00\text{ (g)}/(\text{sample thickness (cm)}\times(1.5\text{ (cm)}/2)^2\times\pi)$$

Examples 1-5,

Comparative Examples 1-3

Carbon materials A and B which were obtained by the following methods were mixed at the mixing ratios (parts by mass) shown in Table 1 to obtain a negative electrode material. In each of the examples and comparative examples, the results of measurement of the compressed density by the above-described method for carbon materials A and B and the mixed carbon material were as shown in Table 1.

(1) Carbon Material A 100 parts of graphite powder which had an average particle diameter of 19.5 μm and a specific surface area (S1) of 5.3 m$^2$/g and which was prepared from natural flake graphite powder by spheroidizing were mixed by solid-state mixing in a V blender with 5 parts of coal pitch powder having an average particle diameter of 35 μm and a softening point of 85° C.

The resulting mixed powder was stationarily placed in a heating furnace and it was subjected therein to heat treatment for 1 hour at 1000° C. under a nitrogen gas stream and then allowed to cool to obtain a carbon material in which turbostratic carbon formed by carbonization of pitch adhered to its surface.

(2) Carbon Material B

Graphite powder which had an average particle diameter of 11.6 μm and a specific surface area (S1) of 6.5 m$^2$/g and which was prepared from natural flake graphite powder by spheroidizing was used as it was.

Example 6

Carbon materials A and B which were obtained by the following methods were mixed at the mixing ratio (parts by mass) shown in Table 1 to obtain a negative electrode material. The results of measurement of the compressed density of carbon materials A and B and the mixed carbon material by the above-described method were as shown in Table 1.

(1) Carbon Material A 100 parts of graphite powder which had an average particle diameter of 29.5 μm and a specific surface area (S1) of 3.6 m$^2$/g and which was prepared from natural flake graphite powder by spheroidizing were mixed by solid-state mixing in a V blender with 5 parts of coal pitch powder having an average particle diameter of 35 μm and a softening point of 85° C.

The resulting mixed powder was stationarily placed in a heating furnace and it was subjected therein to heat treatment for 1 hour at 1000° C. under a nitrogen gas stream and then allowed to cool to obtain a carbon material in which turbostratic carbon formed by carbonization of pitch adhered to its surface.

(2) Carbon Material B

The same spheroidized natural graphite powder as used in Example 1 having an average particle diameter of 11.6 μm and a specific surface area (S1) of 6.5 m$^2$/g was used as it was.

Example 7

Carbon materials A and B which were obtained by the following method were mixed at the mixing ratio (parts by mass) shown in Table 1 to obtain a negative electrode material. The results of measurement of the compressed density of carbon materials A and B and of the mixed carbon material by the above-described method were as shown in Table 1.

(1) Carbon Material A 100 parts of graphite powder which had an average particle diameter of 19.5 μm and a specific surface area (S1) of 5.3 m$^2$/g and which was prepared from natural flake graphite powder by spheroidizing were mixed by solid-state mixing in a V blender with 2 parts of coal pitch powder having an average particle diameter of 35 μm and a softening point of 85° C.

The resulting mixed powder was stationarily placed in a heating furnace and it was subjected therein to heat treatment for 1 hour at 1000° C. under a nitrogen gas stream and then allowed to cool to obtain a carbon material in which turbostratic carbon formed by carbonization of pitch adhered to its surface.

(2) Carbon Material B

The same spheroidized natural graphite powder as used in Example 1 having an average particle diameter of 11.6 μm and a specific surface area (S1) of 6.5 m$^2$/g was used as it was.

Comparative Example 4

Carbon materials A and B which were obtained by the following methods were mixed at the mixing ratio (parts by mass) shown in Table 1 to obtain a negative electrode material. The results of measurement of compressed density of carbon materials A and B and the mixed carbon material by the above-described method were as shown in Table 1.

(1) Carbon Material A 100 parts of the same graphite powder as used in Example 6 which had an average particle diameter of 29.5 μm and a specific surface area (S1) of 3.6 m$^2$/g and which was prepared from natural flake graphite powder by spheroidizing were mixed by solid-state mixing in a V blender with 3 parts of coal pitch powder having an average particle diameter of 35 μm and a softening point of 85° C.

The resulting mixed powder was stationarily placed in a heating furnace and it was subjected therein to heat treatment for 1 hour at 1000° C. under a nitrogen gas stream and then allowed to cool to obtain a carbon material in which turbostratic carbon formed by carbonization of pitch adhered to its surface.

(2) Carbon Material B

The same spheroidized natural graphite powder as used in Example 1 having an average particle diameter of 11.6 μm and a specific surface area (S1) of 6.5 m$^2$/g was used as it was.

Comparative Example 5

Carbon materials A and B which were obtained by the following method were mixed at the mixing ratio (parts by mass) shown in Table 1 to obtain a negative electrode material. The results of measurement of the compressed density of carbon materials A and B and of the mixed carbon material by the above-described method were as shown in Table 1.

(1) Carbon Material A 100 parts of the same graphite powder as used in Example 1 which had an average particle diameter of 19.5 μm and a specific surface area (S1) of 5.3 m$^2$/g and which was prepared from natural flake graphite powder by spheroidizing were mixed by solid-state mixing in a V blender with 10 parts of coal pitch powder having an average particle diameter of 35 μm and a softening point of 85° C.

The resulting mixed powder was stationarily placed in a heating furnace and it was subjected therein to heat treatment for 1 hour at 1000° C. under a nitrogen gas stream and then allowed to cool to obtain a carbon material in which turbostratic carbon formed by carbonization of pitch adhered to its surface.

(2) Carbon Material B

The same spheroidized natural graphite powder as used in Example 1 having an average particle diameter of 11.6 μm and a specific surface area (S1) of 6.5 m$^2$/g was used as it was.

Comparative Example 6

Carbon materials A and B which were obtained by the following method were mixed at the mixing ratio (parts by mass) shown in Table 1 to obtain a negative electrode material. The results of measurement of the compressed density of carbon materials A and B and of the mixed carbon material by the above-described method were as shown in Table 1.

(1) Carbon Material A 100 parts of the same graphite powder as used in Example 1 which had an average particle diameter of 19.5 μm and a specific surface area (S1) of 5.3 m$^2$/g and which was prepared from natural flake graphite powder by spheroidizing were mixed by solid-state mixing in a V blender with 5 parts of coal pitch powder having an average particle diameter of 35 μm and a softening point of 85° C.

The resulting mixed powder was stationarily placed in a heating furnace and it was subjected therein to heat treatment for 1 hour at 1000° C. under a nitrogen gas stream and then allowed to cool to obtain a carbon material in which turbostratic carbon formed by carbonization of pitch adhered to its surface.

(2) Carbon Material B

Spheroidized natural graphite powder having an average particle diameter of 7.6 μm and a specific surface area (S1) of 8.2 m$^2$/g was used as it was.

Comparative Example 7

Carbon materials A and B obtained by the following method were mixed at the mixing ratio (parts by mass) shown in Table 1 to obtain a negative electrode material. The results of measurement of the compressed density of carbon materials A and B and the mixed carbon material by the above-described method were as shown in Table 1.

(1) Carbon Material A 100 parts of the same graphite powder as used in Example 1 which had an average particle diameter of 19.5 μm and a specific surface area (S1) of 5.3 m$^2$/g and which was prepared from natural flake graphite powder by spheroidizing were mixed by solid-state mixing in a V blender with 5 parts of coal pitch powder having an average particle diameter of 35 μm and a softening point of 85° C.

The resulting mixed powder was stationarily placed in a heating furnace and it was subjected therein to heat treatment for 1 hour at 1000° C. under a nitrogen gas stream and then allowed to cool to obtain a carbon material in which turbostratic carbon formed by carbonization of pitch adhered to its surface.

(2) Carbon Material B

Spheroidized natural graphite powder having an average particle diameter of 19.5 μm and a specific surface area (S1) of 5.3 m$^2$/g was used as it was.

Comparative Example 8

Carbon materials A and B obtained by the following methods were mixed at the mixing ratio (parts by mass) shown in Table 1 to obtain a negative electrode material. The results of measurement of the compressed density of carbon materials A and B and the mixed carbon material by the above-described method were as shown in Table 1.

(1) Carbon Material A 100 parts of graphite powder which had an average particle diameter of 11.6 μm and a specific surface area (S1) of 6.5 m$^2$/g and which was prepared from natural flake graphite powder by spheroidizing were mixed by solid-state mixing in a V blender with 10 parts of coal pitch powder having an average particle diameter of 35 μm and a softening point of 85° C.

The resulting mixed powder was stationarily placed in a heating furnace and it was subjected therein to heat treatment for 1 hour at 1000° C. under a nitrogen gas stream and then allowed to cool to obtain a carbon material in which turbostratic carbon formed by carbonization of pitch adhered to its surface.

(2) Carbon Material B

The same spheroidized natural graphite powder as used in Comparative Example 7 having an average particle diameter of 19.5 μm and a specific surface area (S1) of 5.3 m$^2$/g was used after it had been subjected to heat treatment for 1 hour at 3000° C. in argon.

2. Evaluation of Electrode Properties

Electrode properties of the negative electrode materials obtained in the above examples and comparative examples were evaluated in the following manner.

(1) Preparation of Electrodes 97 parts of a negative electrode material were mixed with CMC (sodium carboxymethyl cellulose) as a binder, a dispersion of SBR (styrene butadiene rubber) in water, and a suitable amount of water which was added for adjusting viscosity, and the mixture was stirred to obtain a slurry. The mixing ratio was negative electrode material:CMC:SBR=97: 1:2 (mass ratio). Electrodes were prepared by applying the slurry atop a copper foil having a thickness of 17 μm (coating weight of 4-5 mg/cm$^2$) by the doctor blade method, drying the coated layer, punching out discs having a diameter of 13 mm, and applying the pressure shown in Table 1 with a press so as to obtain an electrode density on the order of 1.70 g/cm$^3$.

The electrode density of each of the resulting electrode was determined by so measuring the thickness of the electrode with a micrometer and the mass of the electrode. Specifically, the previously measured thickness and mass of the copper foil were subtracted from the measured values of thickness and mass for the electrode to obtain the density of the electrode excluding the copper foil.

The following evaluations were carried out using an electrode with an electrode density of 1.68-1.72 g/cm$^3$.

(2) Preparation of a Nonaqueous Test Cell

A coin-shaped nonaqueous test cell was prepared by placing the above-described electrode and a counter electrode which was a Li metal foil on the opposites sides of a polyolefin separator and using a nonaqueous electrolytic solution formed by dissolving LiPF$_6$ as a supporting electrolyte in a mixed solvent of ethylene carbonate (EC):ethyl methyl carbonate (EMC) in a ratio of 1:3 (volume ratio) so that the concentration was 1M.

When evaluation is carried out on the side of the Li counter electrode, basically, doping of a graphite negative electrode with Li is considered to be discharging. Here, however, a negative electrode material was being evaluated, so unless otherwise specified, the charging capacity means the capacity during doping and the discharge capacity means the capacity during undoping.

(3) Measurement of Discharge Capacity

The nonaqueous test cell was doped with a constant current of 25 mA/g until the potential difference with respect to the counter electrode became 0 V (corresponding to charging), and then while maintaining the potential difference at 0 V, doping was continued at a constant voltage until 5 μA/cm$^2$ was reached. The temperature of the nonaqueous test cell during this doping was maintained at 23° C.

Subsequently, at a constant current of 25 mA/g, undoping was carried out until a potential difference of 1.5 V was reached (corresponding to discharge), and the undoping capacity was measured as the discharge capacity. The temperature of the nonaqueous test cell during this undoping was maintained at 23° C.

These doping and undoping operations were repeated for 3 cycles in order to evaluate the below-described charge acceptance and high temperature storage properties. The interval from the end of a doping operation until the start of the undoping operation was 1 minute, and the interval from the end of the undoping operation until the start of the next doping operation was 1 minute, and during these intervals, the temperature of the nonaqueous test cell was also maintained at 23° C.

(4) Charge Acceptance

After the above-described 3 cycles, the nonaqueous test cell was doped at a constant current with a current of 180 mA/g until the potential difference with respect to the counter electrode became 0 V (corresponding to charging). The charging capacity at the constant current at this time was used as an index of the charge acceptance. The temperature of the nonaqueous test cell during this doping operation was maintained at 23° C.

(5) High Temperature Storage Properties

After the above-described 3 cycles, the nonaqueous test cell was doped again at a constant current of 25 mA/g until a potential difference of 0 volts was achieved with respect to the counter electrode (corresponding to discharge), and while maintaining a potential difference of 0 volts, doping was continued at a constant voltage until 5 μA/cm$^2$ was reached. The temperature of the nonaqueous test cell during this doping operation was maintained at 23° C.

Subsequently, the coin-shaped cell was disassembled in an argon atmosphere, and the test electrode was removed and sealed in an aluminum laminate film.

After the sealed test electrode was stored for 10 days at 60° C., a coin-shaped test cell was again assembled in an argon atmosphere using a fresh Li as a counter electrode and adding dropwise an electrolytic solution. The test cell was undoped at a constant current of 25 mA/g until a potential difference of 1.5 V was reached (corresponding to discharge), and the undoping capacity at this time was measured as the discharge capacity after high temperature storage. The ratio of the discharge capacity before storage to the discharge capacity after this high temperature storage was used as an indication of high temperature storage properties. During this doping operation, the temperature of the nonaqueous test cell was maintained at 23° C. as in the doping operation when the discharge capacity before storage was measured.

The test results of negative electrode properties evaluated by the above-described methods when using the mixed carbon material of each of the examples and comparative examples as a negative electrode material are shown in Table 1. It can be seen that a negative electrode having excellent charge is acceptance and high temperature storage properties can be obtained by using a mixed carbon according to the present invention.

TABLE 1

| | Average particle diameter (μm) | | Specific surface area (m²/g) | | Compressed density (g/cm³) | | Mixing ratio (parts by weight) | | Compressed density | Pressing pressure | Discharge capacity | Charge acceptance | Storage properties |
|---|---|---|---|---|---|---|---|---|---|---|---|---|---|
| | A | B | A | B | A | B | A | B | g/cm³ | kgf/cm² | mAh/g | mAh/g | % |
| Comp 1 | 19.6 | 11.6 | 2.3 | 6.5 | 1.64 | 1.80 | 100 | 0 | 1.64 | 900 | 360 | 305 | 58 |
| Ex 1 | 19.6 | 11.6 | 2.3 | 6.5 | 1.64 | 1.80 | 90 | 10 | 1.67 | 830 | 361 | 306 | 75 |
| Ex 2 | 19.6 | 11.6 | 2.3 | 6.5 | 1.64 | 1.80 | 80 | 20 | 1.69 | 780 | 363 | 308 | 85 |
| Ex 3 | 19.6 | 11.6 | 2.3 | 6.5 | 1.64 | 1.80 | 70 | 30 | 1.71 | 750 | 363 | 304 | 84 |
| Ex 4 | 19.6 | 11.6 | 2.3 | 6.5 | 1.64 | 1.80 | 60 | 40 | 1.73 | 700 | 361 | 288 | 80 |
| Ex 5 | 19.6 | 11.6 | 2.3 | 6.5 | 1.64 | 1.80 | 50 | 50 | 1.74 | 680 | 361 | 255 | 70 |
| Comp 2 | 19.6 | 11.6 | 2.3 | 6.5 | 1.64 | 1.80 | 40 | 60 | 1.75 | 650 | 360 | 220 | 65 |
| Comp 3 | 19.6 | 11.6 | 2.3 | 6.5 | 1.64 | 1.80 | 0 | 100 | 1.80 | 550 | 358 | 185 | 50 |
| Comp 4 | 29.7 | 11.6 | 2.2 | 6.5 | 1.80 | 1.80 | 70 | 30 | 1.81 | 550 | 361 | 234 | 80 |
| Ex 6 | 29.8 | 11.6 | 1.4 | 6.5 | 1.77 | 1.80 | 70 | 30 | 1.79 | 580 | 360 | 287 | 85 |
| Ex 7 | 19.6 | 11.6 | 3.6 | 6.5 | 1.76 | 1.80 | 70 | 30 | 1.78 | 590 | 360 | 290 | 84 |
| Comp 5 | 19.8 | 11.6 | 1.3 | 6.5 | 1.58 | 1.80 | 70 | 30 | 1.67 | 830 | 357 | 310 | 65 |
| Camp 6 | 19.6 | 7.6 | 2.3 | 8.2 | 1.64 | 1.72 | 70 | 30 | 1.67 | 830 | 358 | 303 | 50 |
| Comp 7 | 19.6 | 19.5 | 2.3 | 5.3 | 1.64 | 1.87 | 70 | 30 | 1.71 | 750 | 360 | 231 | 65 |
| Comp 8 | 13.2 | 19.5 | 2.7 | 4.8 | 1.48 | 1.86 | 60 | 40 | 1.61 | 980 | 357 | 280 | 55 |

The invention claimed is:

1. A mixed carbon material comprising carbon material A which has cores of graphite powder having carbon adhered to or coated on the surface of the cores, and carbon material B which is graphite powder, wherein
    the carbon which is adhered to or coated on the surface of the cores of carbon material A is turbostratic carbon,
    the compressibility which is expressed by the compressed density defined below is 1.60-1.78 g/cm³ for carbon material A, 1.75-1.85 g/cm³ for carbon material B and 1.67-1.79 g/cm³ for the mixed carbon material, and the compressibility of carbon material A is less than the compressibility of carbon material B,
    said compressed density being the density (g/cm³) when 1.00 grams of a material are packed into a cylindrical mold having an inner diameter of 15 mm and compressed by applying a force of 8.7 kN followed by reducing the force to 0.15 kN,
    the average particle diameter of carbon material B is less than or equal to the average particle diameter of carbon material A, and
    the mixing ratio of carbon material A to carbon material B (carbon material A/carbon material B) is from 1 to 9 parts of carbon material A to 1 part of carbon material B as a mass ratio.

2. A mixed carbon material as set forth in claim 1 wherein carbon material B is natural flake graphite powder.

3. A mixed carbon material as set forth in claim 1 wherein the average particle diameters of carbon material A and carbon material B are 15-30 μm and 8-15 μm, respectively.

4. A mixed carbon material as set forth in claim 1 wherein the specific surface area of carbon material B is at most 8 m²/g.

5. A negative electrode for a nonaqueous secondary battery prepared using a mixed carbon material set forth in claim 1.

* * * * *